Dec. 8, 1931. T. THOMSON ET AL 1,835,445
MEANS FOR GAS CLEANING
Filed July 13, 1928
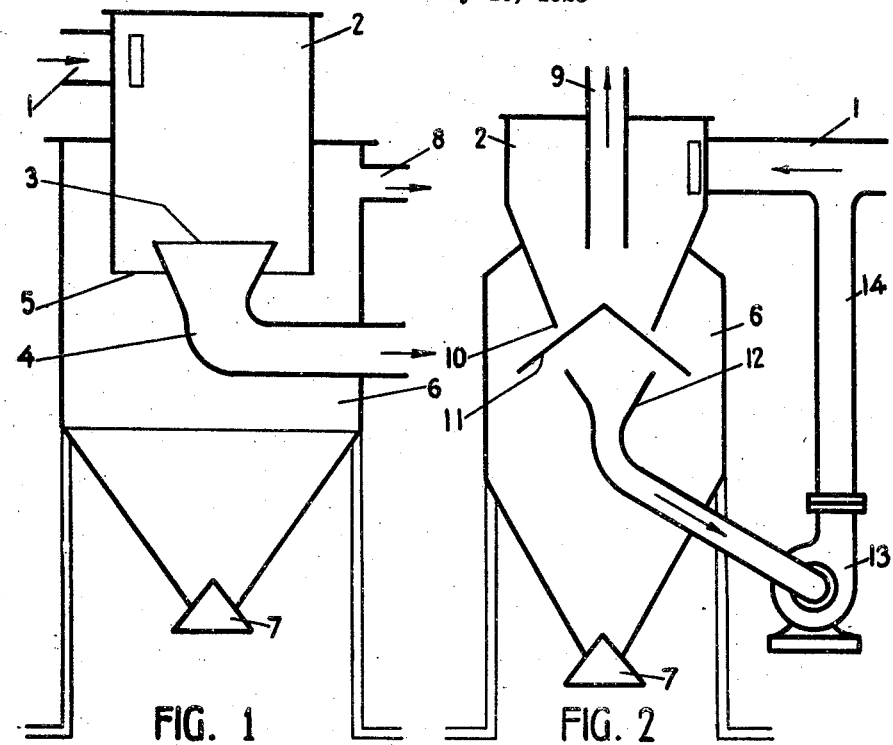
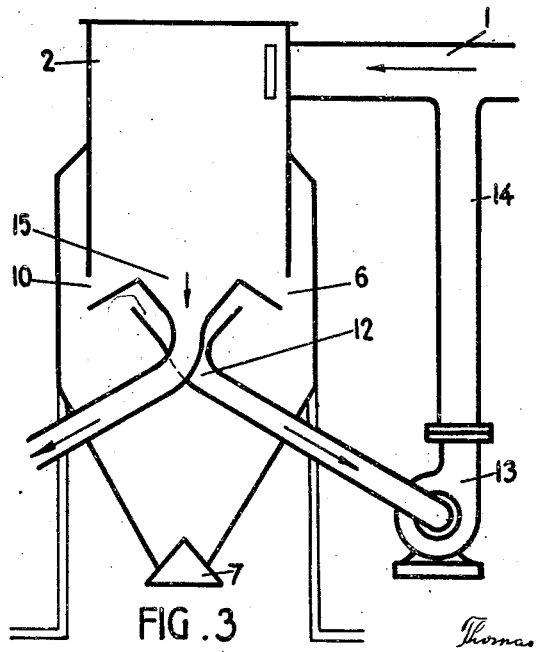
Inventors,
Thomas Thomson and
Nicholas Nisbet
M.H. Lockwood
Attorney.

Patented Dec. 8, 1931

1,835,445

UNITED STATES PATENT OFFICE

THOMAS THOMSON AND NICHOLAS NISBET, OF SCUNTHORPE, ENGLAND

MEANS FOR GAS-CLEANING

Application filed July 13, 1928, Serial No. 292,600½, and in Great Britain July 23, 1927.

This invention relates to gas-cleaning, that is to say the removal of suspended matter (hereinafter also referred to as "dust") from gases containing it. The object of the invention is to provide simple and cheap apparatus for efficiently performing the desired operation.

In order that the invention may be readily understood it will be described with reference to the accompanying diagrammatic drawings, in which Figure 1 shows a section of a form of apparatus comprising a centrifugal separator and a settling chamber, and Figure 2 shows an arrangement comprising a centrifugal separator, a settling chamber and a fan for returning gas cleaned in the settling chamber to the inlet to the centrifugal separator. Figure 3 shows a modified form of the arrangement shown in Figure 2 in which the outlet from the centrifugal separator is arranged downwardly.

In the arrangement shown in Figure 1, dust-laden gas is tangentially admitted through conduit 1 into the centrifugal separator 2 which is of cylindrical form. The gas is thus caused to perform a whirling motion about the axis of the separator, the dust being thereby thrown to the periphery of the separator 2. The clean gas from the central zone of the chamber is withdrawn through the flared mouth 3 of the conduit 4 (the primary outlet) whilst the dust and dirty gas at the periphery of the chamber pass downwardly through the annular space 5 between the flared mouth 3 and the wall of the separator 2. The flow of the cleaned gas into and through the primary outlet may be maintained by any desired means, preferably those embodied in the plant to which the invention is applied.

After passing through the annular space 5 the dust and dirty gas enter the secondary separator 6 which is shown as a simple settling chamber provided with a closure 7 through which the dust which collects in the separator may from time to time be removed. An outlet 8 for the re-cleaned gas is provided in the separator 6, which is connected to some means such as a fan which ensures that the dirty gas flows through the annular outlet space 5 with sufficient velocity to ensure that the dust with which it is laden is not drawn back into and mixed with the cleaned gas. The gas from the outlet 8 may be passed to other apparatus for further treatment or may be returned to the inlet to the separator 2.

In the construction shown in Figure 2, the dirty gas from the inlet 1 passes tangentially into the cylindro-conical separator 2, the clean gas being removed through the central outlet 9. The dust and dirty gas pass downwardly through the annular outlet 10 between the lower edge of the separator 2 and a conical baffle 11, into the secondary separator 6 provided with a dust outlet 7 as before. The gas which has been re-cleaned in separator 6 passes under the baffle and through the outlet duct 12 to the fan 13 and back through the duct 14 to the dirty gas inlet 1.

The arrangement shown in Figure 3 is similar to that shown in Figure 2, save that the clean gas is removed downwards through the central outlet 15, instead of in an upward direction.

With the arrangements in which gas from the secondary separator is returned to the centrifugal separator, it should be noted that the centrifugal separator 2 should be of sufficient capacity to deal with the full volume of dirty gas to be treated plus the volume of gas which is withdrawn from the secondary separator and returned to the inlet to the centrifugal separator.

We claim:—

1. Gas-cleaning apparatus comprising a centrifugal separator having an inlet for gas to be cleaned, an outlet for gas cleaned in the said separator, a conical baffle member, an annular outlet formed between the wall of the said separator and the said conical baffle member, separating means connected to the said annular outlet, an outlet for matter separated in the said separating means, and an outlet for gas from the said separating means.

2. Gas-cleaning apparatus comprising a centrifugal separator having an inlet for gas to be cleaned, an outlet for gas cleaned in the said separator, a conical baffle member, an annular outlet formed between the wall of the said separator and the said conical baffle member, separating means connected to the said annular outlet, an outlet for matter separated in the said separating means, an outlet for gas from the said separating means, the said latter outlet having its mouth positioned co-axial with and adjacent to the conical baffle member aforesaid.

3. Gas-cleaning apparatus comprising a centrifugal separator having an inlet for gas to be cleaned, an outlet for gas cleaned in the separator, a conical baffle member, an annular outlet formed between the wall of the said separator and the said conical baffle member, a settling chamber connected to the said annular outlet, an outlet for matter separated in the settling chamber, an outlet for gas from the said settling chamber, the said latter outlet having its mouth positioned co-axial with and adjacent to the conical baffle member aforesaid, and means for withdrawing gas through the said latter outlet and for returning the withdrawn gas to the inlet to the said centrifugal separator.

4. Gas-cleaning apparatus comprising a centrifugal separator having an inlet for gas to be cleaned, an outlet for gas cleaned in the said separator, an annular outlet of greater area than the inlet formed at the lower edge of said centrifugal separator for the peripheral discharge therefrom of dirty gas and matter removed from gas cleaned in said separator, additional separating means into which the lower end of said separator projects for the delivery thereinto of the dirty gas and matter discharged from the said annular outlet, an outlet for removing matter separated from the gas in the said additional separating means, and an outlet from said additional separating means for discharge of the gas therefrom.

THOMAS THOMSON.
NICHOLAS NISBET.